US012746791B1

(12) United States Patent
Schibler et al.

(10) Patent No.: US 12,746,791 B1
(45) Date of Patent: Sep. 29, 2026

(54) AMPHIBIOUS RESCUE AND UTILITY VEHICLE

(71) Applicant: Schibler Systems Integration, llC, Delaware, OH (US)

(72) Inventors: Matthew Schibler, Dayton, OH (US); Michael Schibler, Delaware, OH (US)

(73) Assignee: Schibler Systems Integration, llC, Delaware, OH (US)

(*) Notice: Subject to any disclaimer, the term of this patent is extended or adjusted under 35 U.S.C. 154(b) by 351 days.

(21) Appl. No.: 18/531,484

(22) Filed: Dec. 6, 2023

Related U.S. Application Data

(60) Provisional application No. 63/386,221, filed on Dec. 6, 2022.

(51) Int. Cl.
*B60F 3/00* (2006.01)

(52) U.S. Cl.
CPC .......... *B60F 3/0061* (2013.01); *B60F 3/0007* (2013.01); *B60F 3/0038* (2013.01)

(58) Field of Classification Search
CPC ........ B60F 3/00; B60F 3/0061; B60F 3/0007; B60F 3/0038
See application file for complete search history.

(56) References Cited

U.S. PATENT DOCUMENTS 3,435,798 A * 4/1969 Rieli .......................... B60N 2/24 440/12.66
3,452,702 A * 7/1969 Slemmons ............ B60F 3/0007 180/9.1
9,527,565 B1 * 12/2016 Guidry .................. B63H 25/44

FOREIGN PATENT DOCUMENTS

EP 0325091 A1 * 7/1989 ............ E02F 3/9206
GB 2287910 A * 10/1995 ............ B60F 3/0038

* cited by examiner

*Primary Examiner* — Stephen P Avila

(57) ABSTRACT

An amphibious vehicle is configured to transport people, cargo, or equipment safely and effectively over both land, and water, to include swift flowing water often encountered in flood scenarios and zero turn radius maneuverability required in confined areas. The forward side thrusters provide turning force for yaw control and are controlled primarily through the driver's use of pedals in a similar arrangement to aircraft rudder pedals. An articulating, telescoping ladder fitted with an overhead winch at the end functions as a ladder, a crane, and a hoist for accessing upper levels of buildings, moving people or cargo around the perimeter of the vehicle, and loading people or cargo into the front of the vehicle via the forward door that can be lowered to horizonal or ramp positions.

20 Claims, 17 Drawing Sheets

AMPHIBIOUS RESCUE AND UTILITY VEHICLE

RELATED APPLICATION

This application claims priority to provisional patent application U.S. Ser. No. 63/386,221 filed on Dec. 6, 2022, the entire contents of which is herein incorporated by reference.

BACKGROUND

The embodiments herein relate generally to amphibious vehicles, utility motor vehicles and watercraft.

Prior to embodiments of the disclosed invention, amphibious vehicles suffered problems with poor performance either on land or on water. An amphibious vehicle can traverse both land and water, however, no existing vehicle optimally blends land travel and water travel capabilities. Existing vehicles are either highly capable land vehicles with poor on-water performance, or are highly capable boats with poor capability on land and off-road. No current vehicle has sufficient on-water controllability to operate in confined urban areas with narrow passages and obstructions often found in flooded areas. Furthermore, no vehicle currently exists for rescuing large sums of people from widespread flood events and/or localized flooding in dangerous swift flowing water. Embodiments of the disclosed invention solve these problems.

SUMMARY

An amphibious vehicle is configured to provide people and equipment transport across dry land and over water. The amphibious vehicle has a center chassis section joined to two buoyant outer fairing sections, referred to as sponsons, on the left and right sides. These sponsons provide flotation, smooth the flow of water around the wheels, and pivot upward to allow access to the wheels for maintenance and to reduce overall width of the vehicle for highway transport. The center chassis has a forward bulkhead that functions as a bow and is hinged at the bottom to form a ramp allowing access into the vehicle from the front. The center chassis has a rear bulkhead that forms a stern joined with a centerline-mounted waterjet providing vectored propulsion force in water. The centerline water jet on the stern is mounted high above the ground to provide obstacle clearance in land mode and to prevent the jet from sucking debris from the bottom of a lake, river, or flooded neighborhood. The center chassis has at least two wheels fixed in line to the left and right sides, to allow rolling over land. The side-mounted wheels are powered by at least two electric or hydraulic motors independently driving the left and right side wheels at variable speeds for normal turning and zero turn radius maneuverability in constrained areas. The side-mounted wheels are fitted with optional over-tire-tracks (OTTs) to reduce ground pressure on soggy surfaces, when necessary.

A plurality of side-mounted wheels are permanently mounted at variable heights, with the lowest wheels in the middle section of the vehicle which create a slight arc where the tires contact the ground. The arced wheel configuration allows the vehicle to rock fore and aft slightly when rolling over a bump in its path. The tension on the lower bridged section of the OTTs provide some dampening of the rocking motion when the bump passes by the lead wheel. Additionally, control of the rocking amplitude can be achieved through manipulation of the longitudinal center of gravity by moving liquid loads within the fuel tanks or the center, and lower fairings. Shifting the center of gravity forward reduces the rocking motion and stiffens the bump response, while moving the center of gravity aft results in greater rocking motion but a softer ride. The arced configuration alleviates the need for a complex independent suspension system for each wheel to traverse rough terrain.

A seat for a driver and at least two passengers or crew is arranged either along the side or on the centerline inside the center chassis section. Seating for passengers is provided by the ledge that lines the left and right sides of the center chassis. The saddle-type seat provides ease-of-access to passengers for the driver and crew with equal vision to all sides of the vehicle. The centerline saddle seat also provides the driver an unobstructed view of the water directly in front of the vehicle when on the water with the bow ramp lowered. This viewpoint is critical in retrieving people or items from the water via the bow ramp and/or the overhead hoist. A side-mounted driver seat configuration within the center chassis section provides a larger, undivided section of floor-space for cargo or people, if desired.

A vehicle control system is mounted on a console proximate to the driver seat within the center chassis. The control systems is comprised of a steering wheel, a throttle lever, two pedals, and engine, hydraulic, electric, ballast, and fuel system controls. In land mode, the steering wheel varies the speeds between left and right side wheels to induce turning when the steering wheel is turned less than 360 degrees from neutral. When the steering wheel is turned beyond 360 degrees from neutral, the left and right wheels rotate in opposite directions to enact zero turn radius pivoting. In water mode, the steering wheel directs the stern mounted water jet nozzle left and right to induce turning. The throttle lever is used for engine and drive wheel rpm control, dictates direction of rotation of the vehicle's drive wheels in forward or reverse, and directs the position of the stern jet reversing bucket and side thruster vectoring cups. A single pedal on each side of the control console is referred to as a "rudder pedal" or "yaw pedal". These pedals control flow direction and speed of two thrusters mounted on the left and right sides of the vehicle's forward section. Similar to aircraft rudder pedal controls, pushing the right pedal directs the thrusters to propel water towards the left, resulting in the front of the vehicle moving to the right. When used in conjunction with the steering wheel and throttle, the pedals allow the driver to maneuver the vehicle in place with zero turn radius, slide left and right perpendicular to the vehicle centerline, and also move forward and aft by actuating vectoring cups or nozzles mounted on the outboard sides of the thruster tubes. The thruster vectoring cups or nozzles divert flow fore or aft when actuated by a combination of throttle lever and/or pedal movement.

An articulating and telescoping ladder/crane is mounted to the vehicle. The ladder provides multiple functions including access to upper floors and roofs of buildings and/or homes in flooded regions. The ladder/crane also provides overhead crane and hoist capability to lift and move non-ambulatory people or bulk items around the perimeter of the vehicle and into the vehicle via the front bow ramp. The ladder structure is also used for deflecting or moving low-hanging obstacles such as un-energized power lines, tree limbs, or traffic lights. Recovery of people from the water is achieved with simultaneous use of the overhead ladder hoist and the bow ramp.

Fairings are mounted on the bottom of the vehicle between the wheels. The fairings are partitioned internally by transverse bulkheads and provide ballast in variable positions and quantities to manipulate vehicle center of gravity in all three axes. The fairings also provide flotation when empty, and tank capability to transport liquid loads. The fairings are formed and arranged to direct water upward toward the stern-mounted water jet intake during higher speed travel on water. The fairings are shaped to force the converging wakes from the left and right sides of the vehicle to interact and force water upward toward the jet intake during semi-planing operations, thus providing uninterrupted water flow through the high-mounted water jet despite the vehicle rising slightly as it increases speed. Fixed or variable geometry exterior fins can also be affixed to the fairings to shape the converging wakes at various speeds and sea state conditions.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
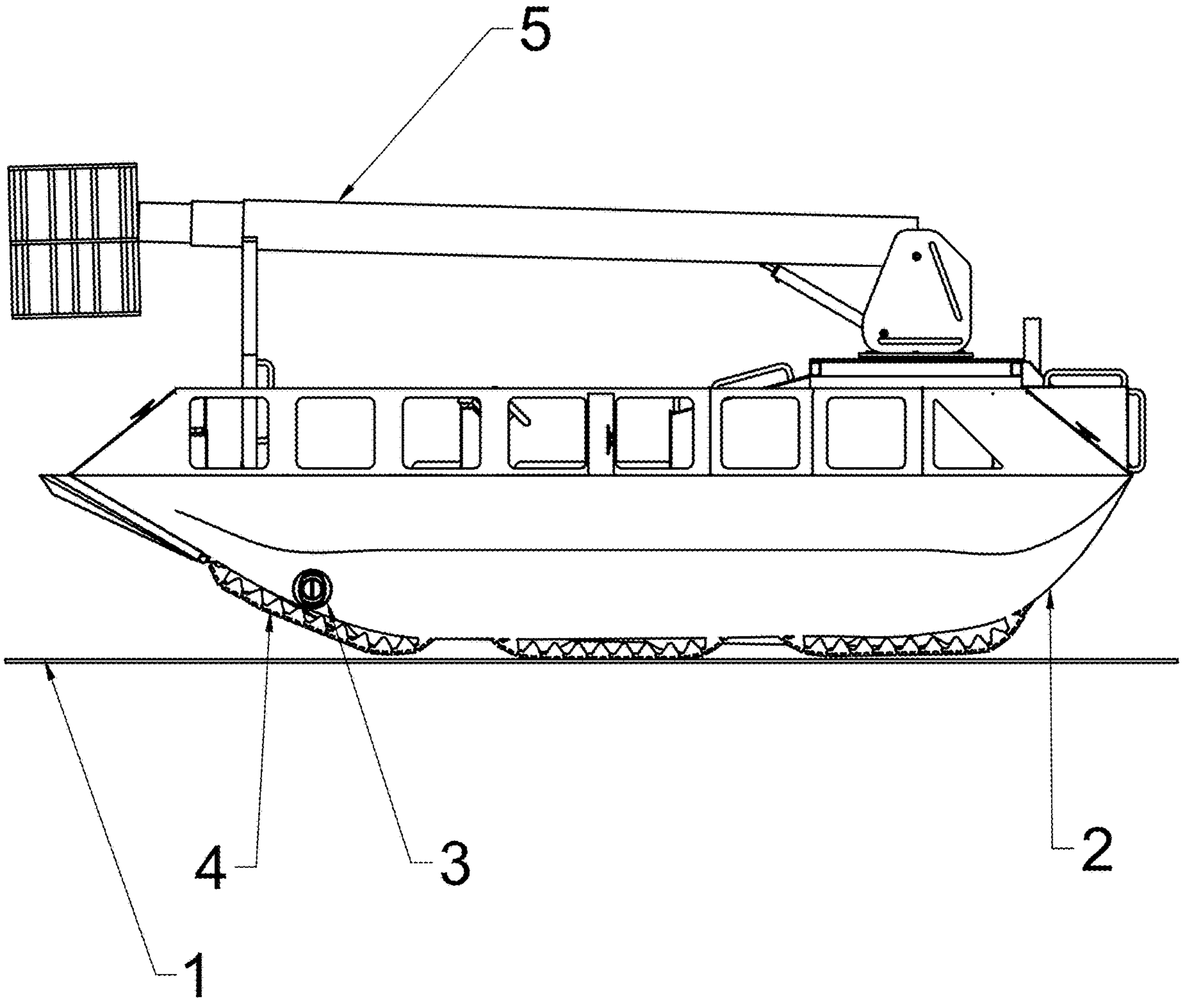
FIG. 1 illustrates a left side elevation view of the vehicle with left sponson, side thruster, left wheel arrangement with optional OTT installed, ground surface visible, and ladder/crane/hoist in neutral position.
Figure 2:
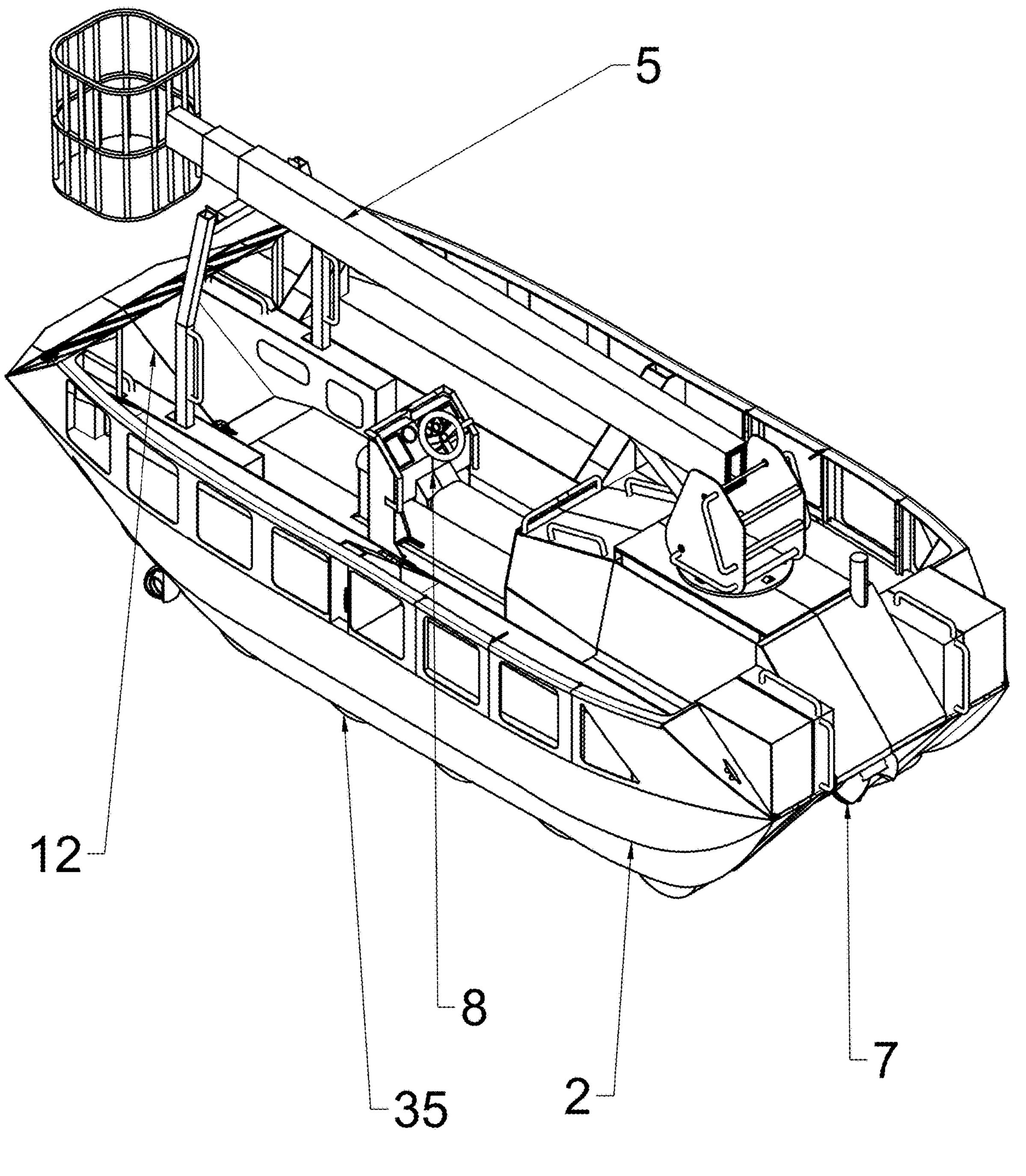
FIG. 2 illustrates a top left rear view of the vehicle with ladder/crane/hoist in neutral position, rear marine jet, centerline driver console, engine compartment, and front ramp in the up position.
Figure 3:
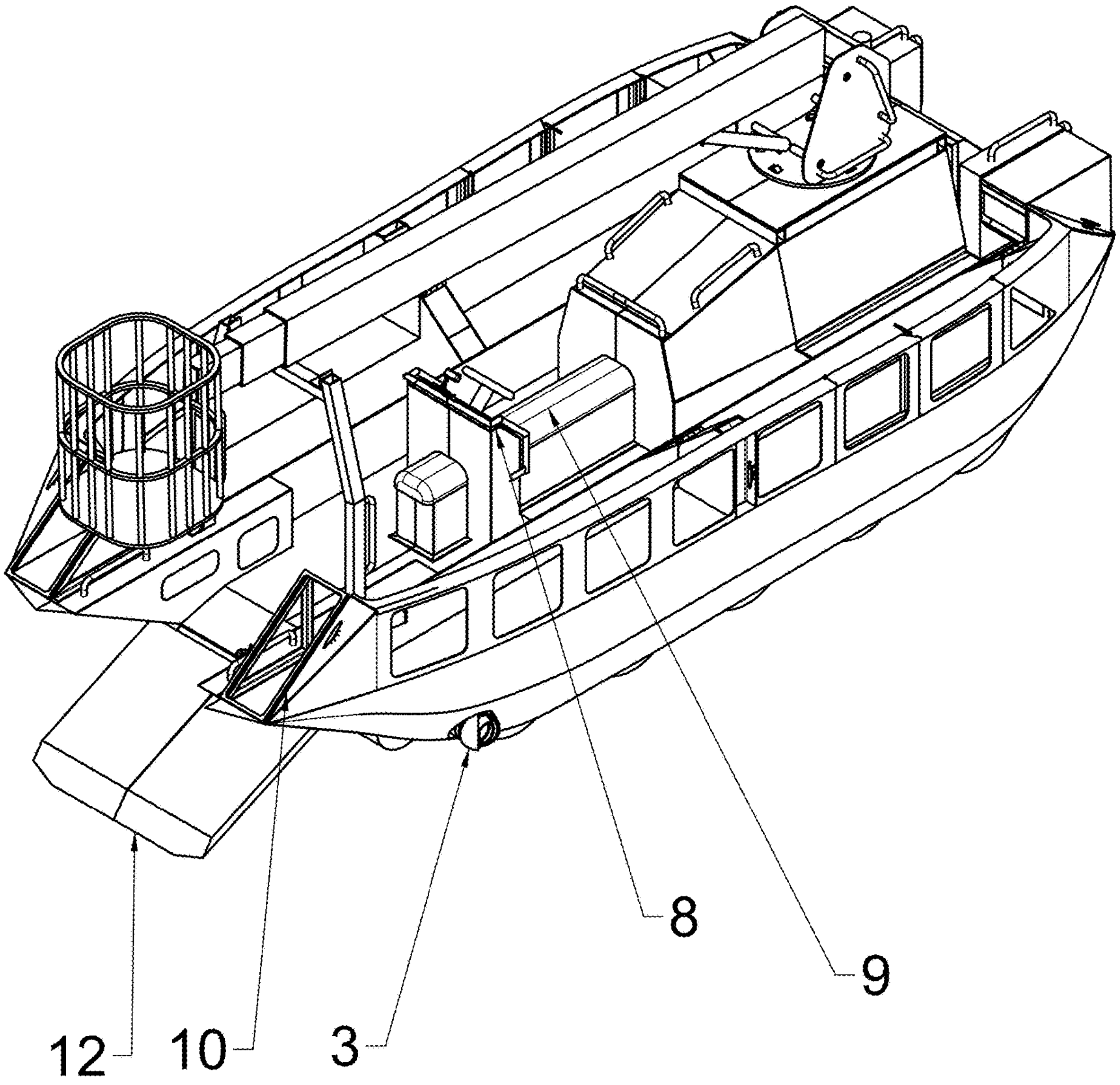
FIG. 3 illustrates a top left front view of the vehicle with ladder/crane/hoist in neutral position, left side thruster, engine compartment, centerline driver console, tri-fold forward windows open in the middle, and front ramp lowered down to the ground for personnel entry or equipment loading when the vehicle is on the ground or in the water.
Figure 4:
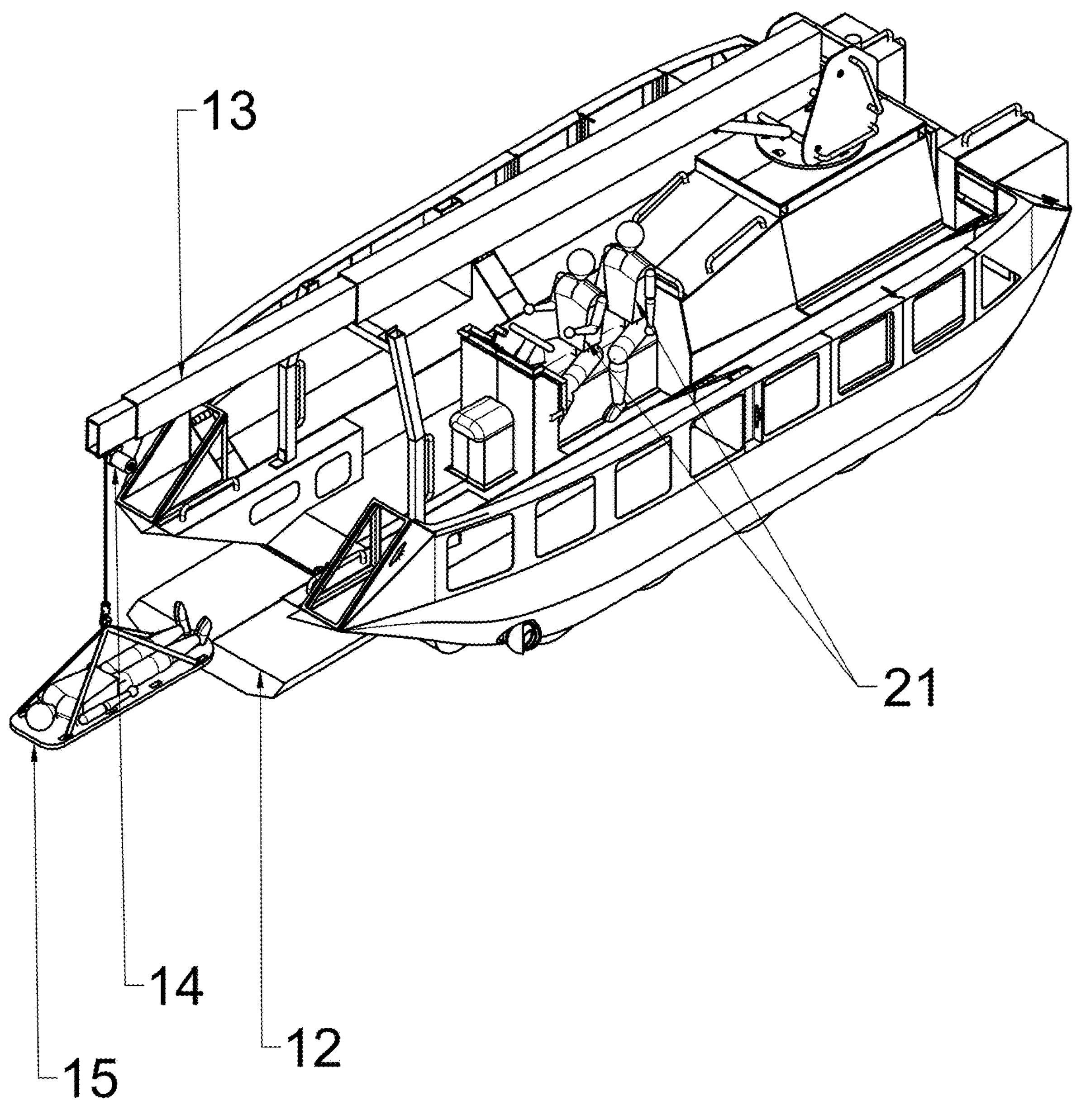
FIG. 4 illustrates a top left front view of the vehicle with ladder/crane/hoist loading a person on a litter with the telescoping ladder/crane/hoist partially extended outward, left side thruster, engine compartment, centerline driver console, inner four tri-fold forward windows in the open position, and front ramp lowered to the horizontal position for personnel entry or equipment loading when the vehicle is on the ground or in the water.
Figure 5:
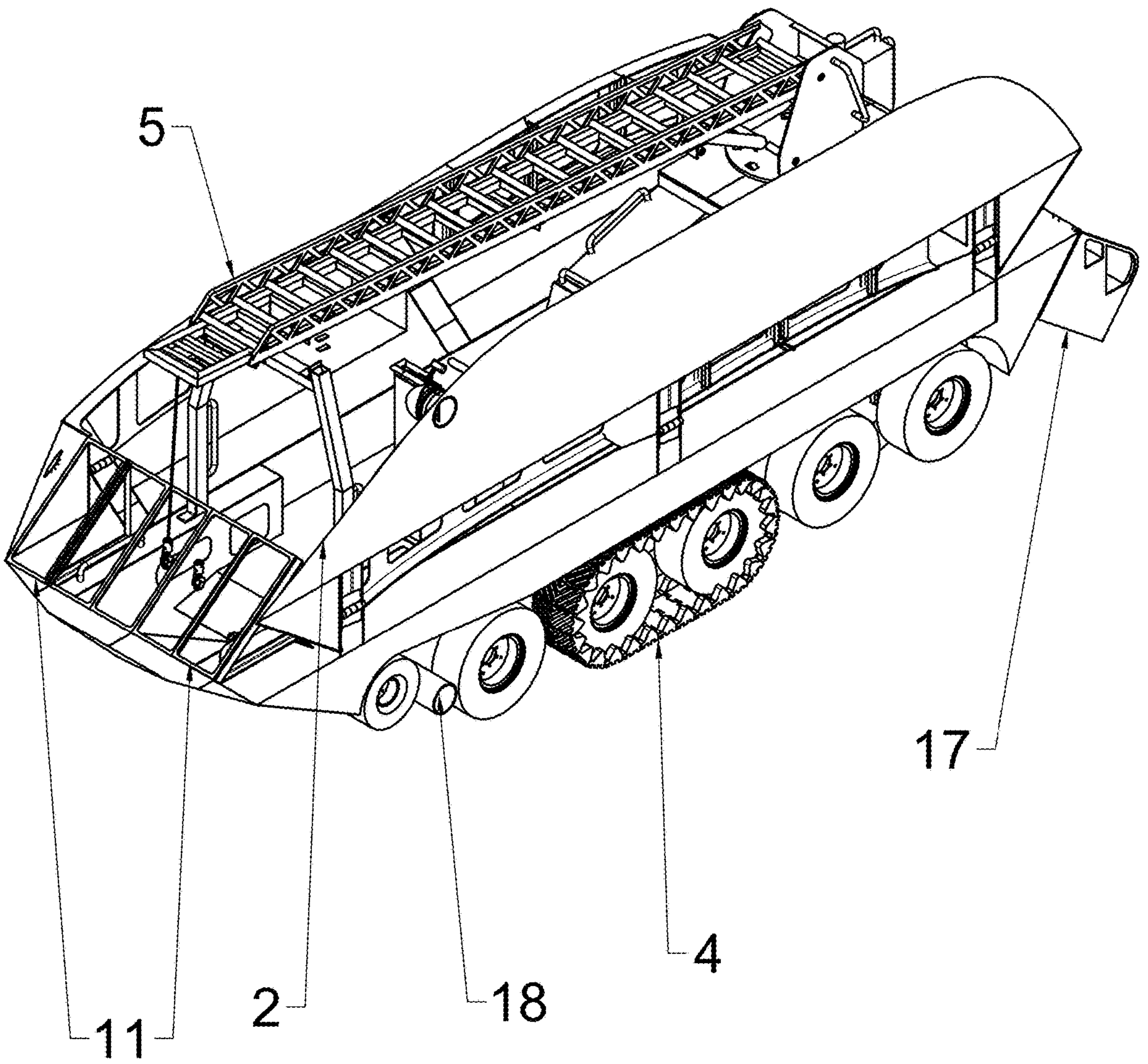
FIG. 5 illustrates a top left front view of the vehicle with left sponson raised to the up position, right sponson in the lowered position, rear entry steps in the lowered position, forward left outer tri-fold window in the open position, forward right outer tri-fold window in the closed position, forward ramp in the up position, and left side thruster intermediate tube, cups, and nozzle, and optional OTTs installed.
Figure 6:
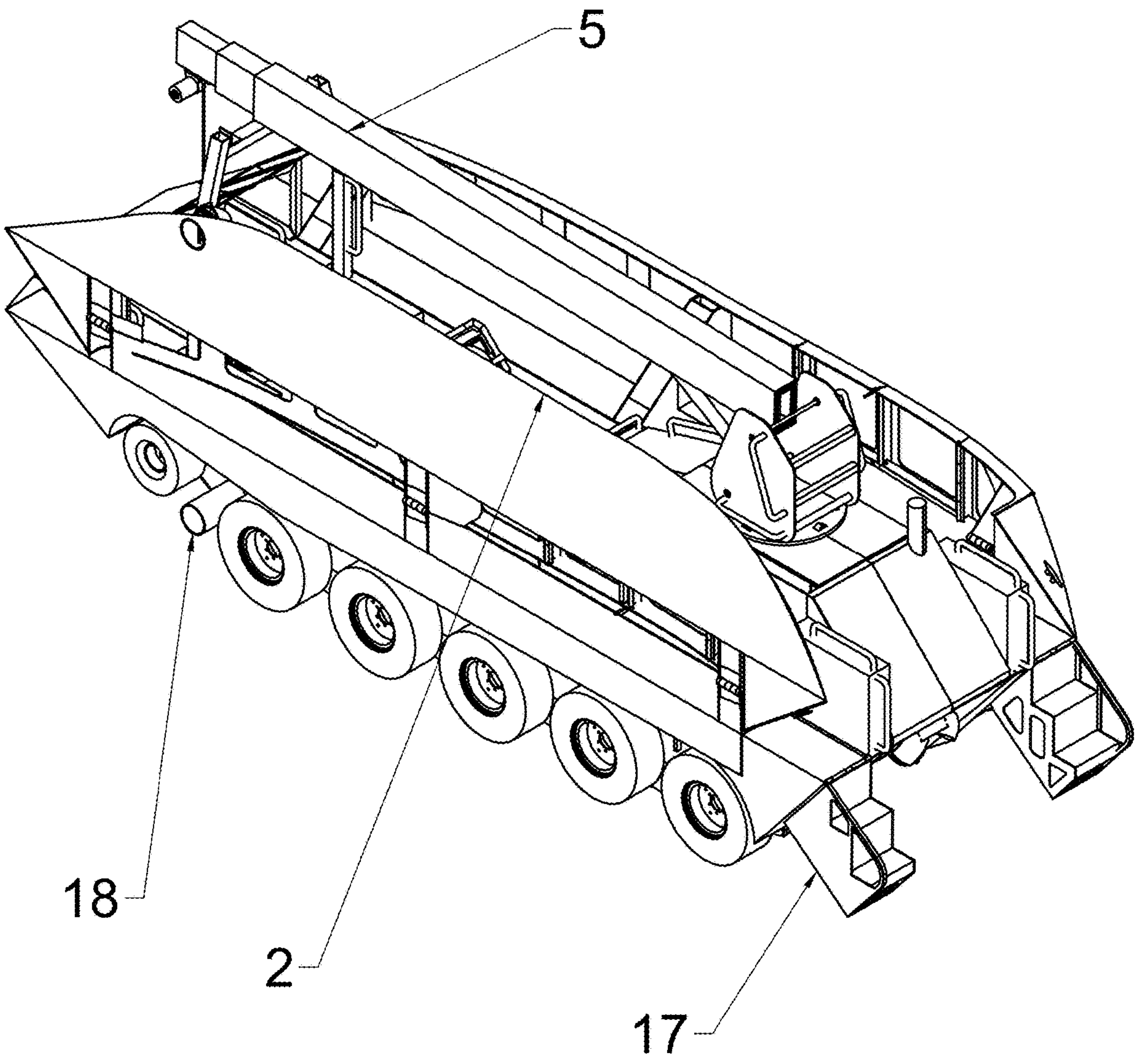
FIG. 6 illustrates a top left rear view of the vehicle with left sponson raised to the up position, right sponson in the lowered position, rear entry steps in the lowered position, ladder/crane/hoist in the neutral position, and optional OTTs installed.
Figure 7:
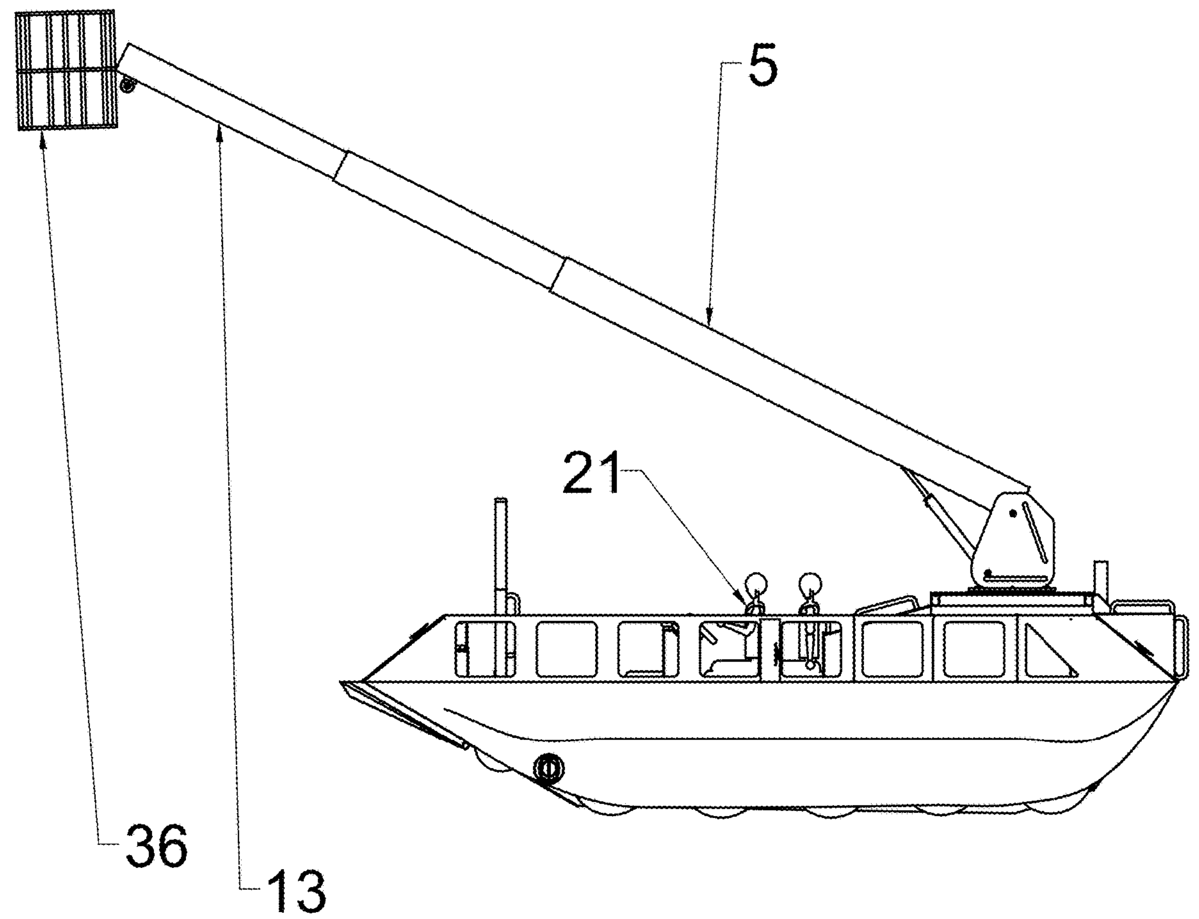
FIG. 7 illustrates a left side elevation view of the vehicle with both sponsons in the lowered position, driver and crew sitting at the centerline console position, front ramp in the up position, and the telescoping ladder/crane/hoist raised and extended.
Figure 8:
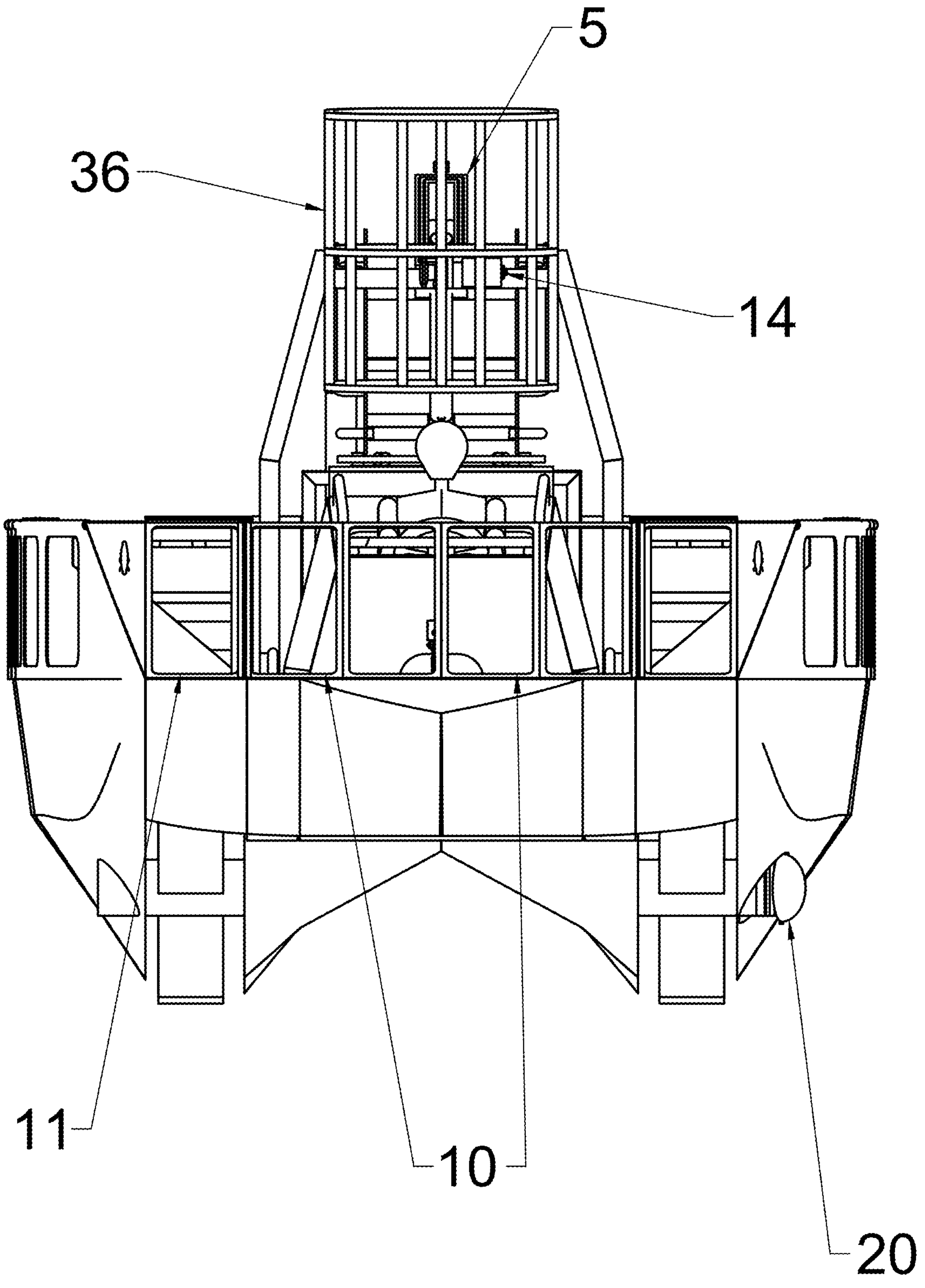
FIG. 8 illustrates a front view of the vehicle with ladder/crane/hoist in the neutral position with hoist winch visible, optional side thruster vectoring cups and nozzle on the left side, simple side thruster tube on the right side, front ramp in the up position, left and right sponsons in the down position, and six tri-fold windows all in the closed position.
Figure 9:
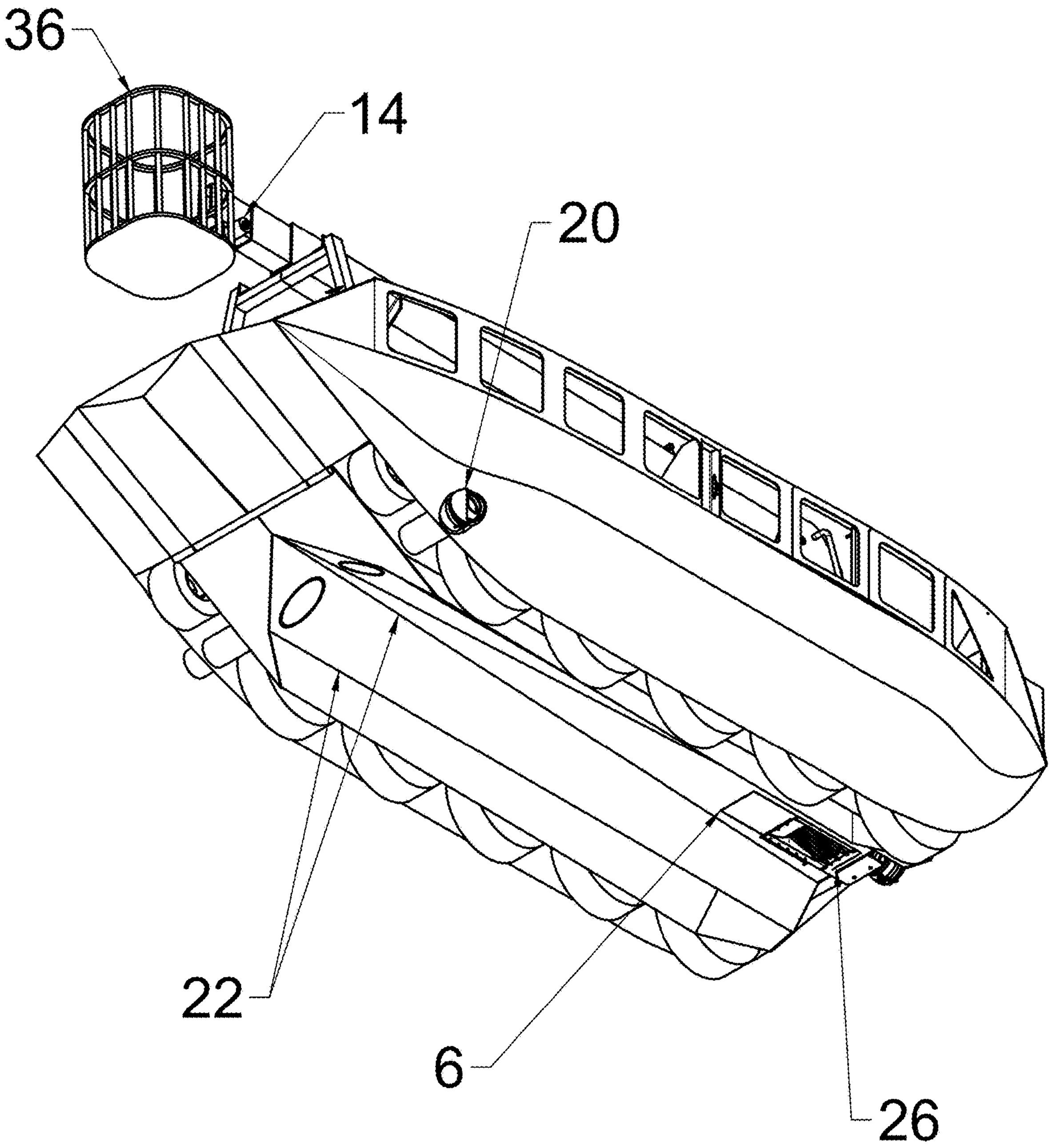
FIG. 9 illustrates a left front underside view of the vehicle with ladder/crane/hoist in the neutral position, sponsons in the lowered position, hoist winch, side thruster inner tube sections, left side thruster nozzle and vectoring cups, right inner ballast/flotation/tank fairings, center chassis bottom, and rear water jet intake.
Figure 10:
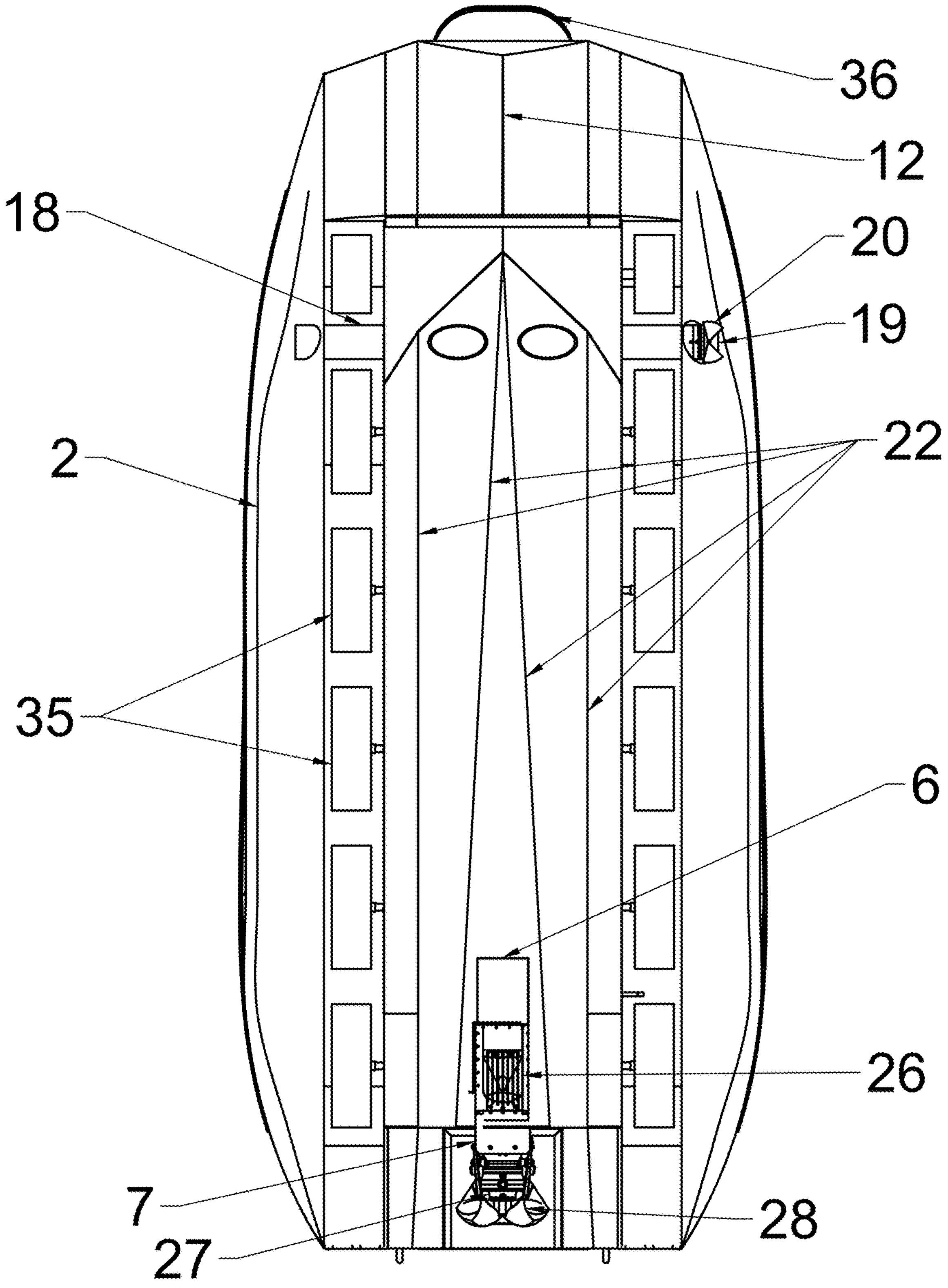
FIG. 10 illustrates a centerline bottom view of the vehicle with ladder/crane/hoist in the neutral position, sponsons in the lowered position, hoist winch, side thruster inner tube sections, optional left side thruster nozzle and vectoring cups, simple side thruster tube on the right side, right inner ballast/flotation/tank fairings, center chassis bottom, and rear water jet intake.
Figure 11:
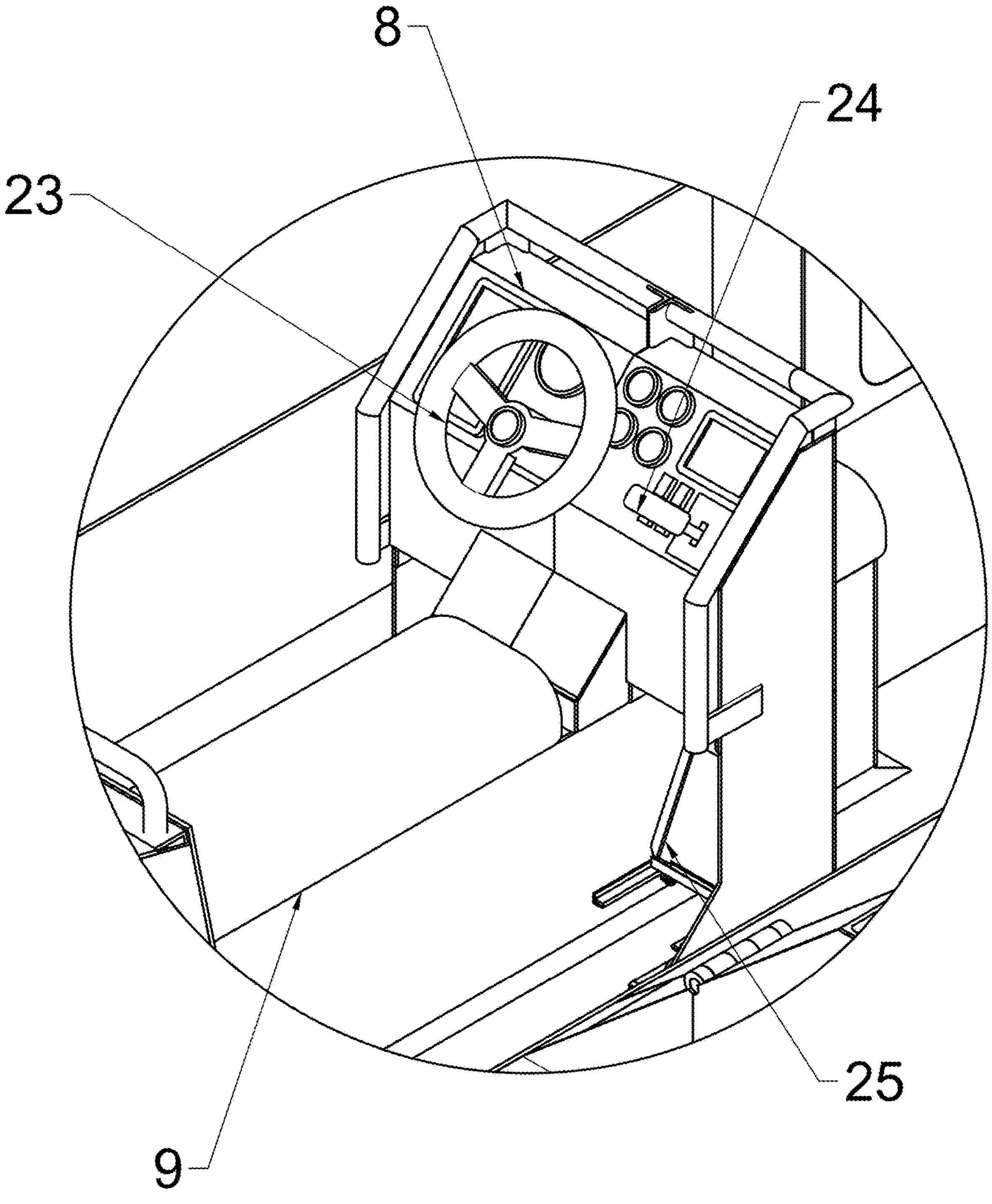
FIG. 11 illustrates top view of the driver console in centerline mounted configuration with a saddle-type seat, a steering wheel, a throttle lever, multiple navigation and systems displays, switches, and pedals for yaw control in the water and braking when on land and in water.
Figure 12:
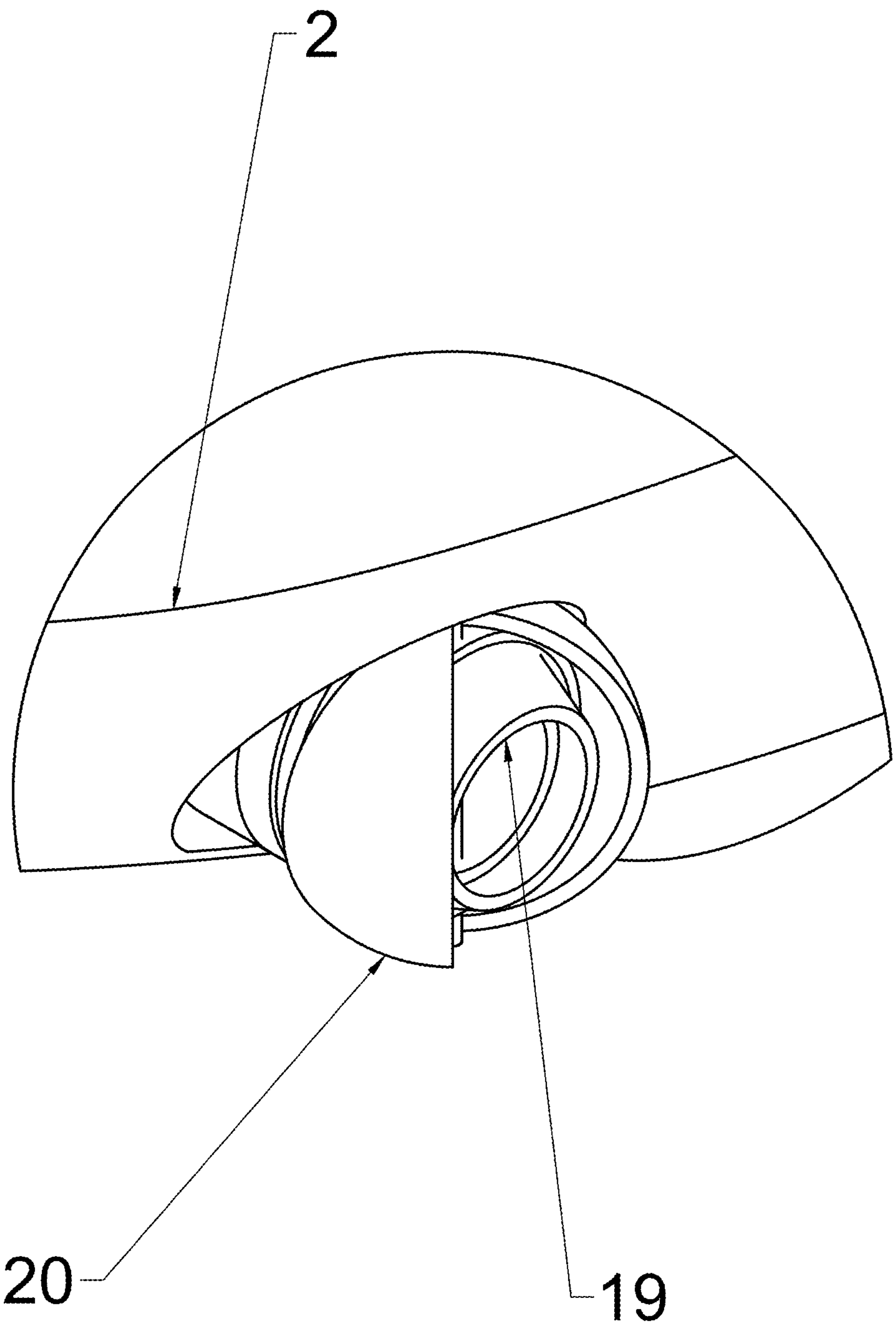
FIG. 12 illustrates the left side thruster with vectoring cups, nozzle, and thruster tube mounted in the forward portion of the left sponson.
Figure 13:
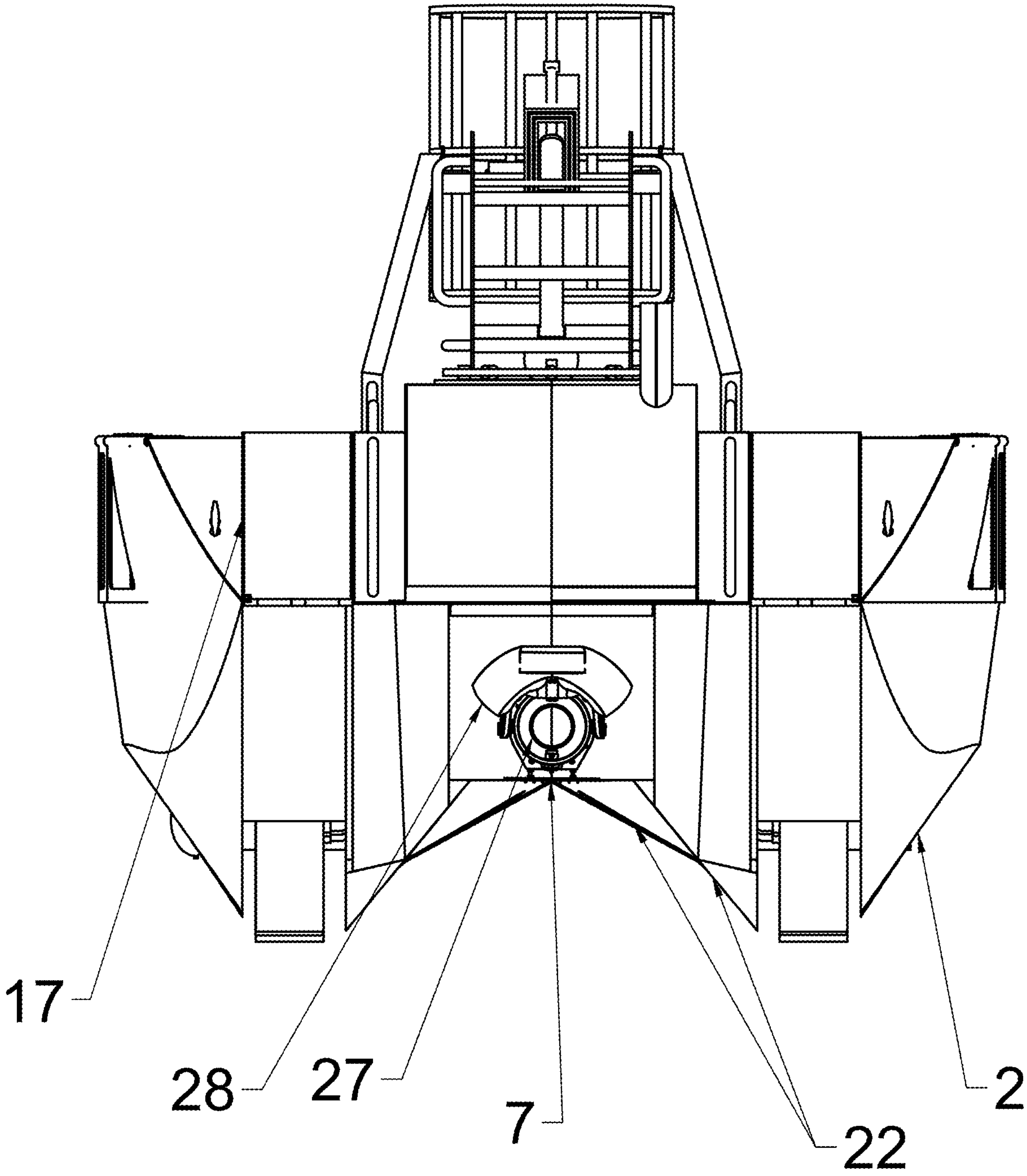
FIG. 13 illustrates a rear centerline view of the vehicle with sponsons in the lowered position, side thruster inner tube sections, optional left side thruster nozzle and vectoring cups, side thruster tube on the right side without nozzle or vectoring cups installed, rear boarding steps in the up position, right and left inner ballast/flotation/tank fairings, center chassis bottom, rear water jet intake, water jet nozzle, and water jet reversing bucket.
Figure 14:
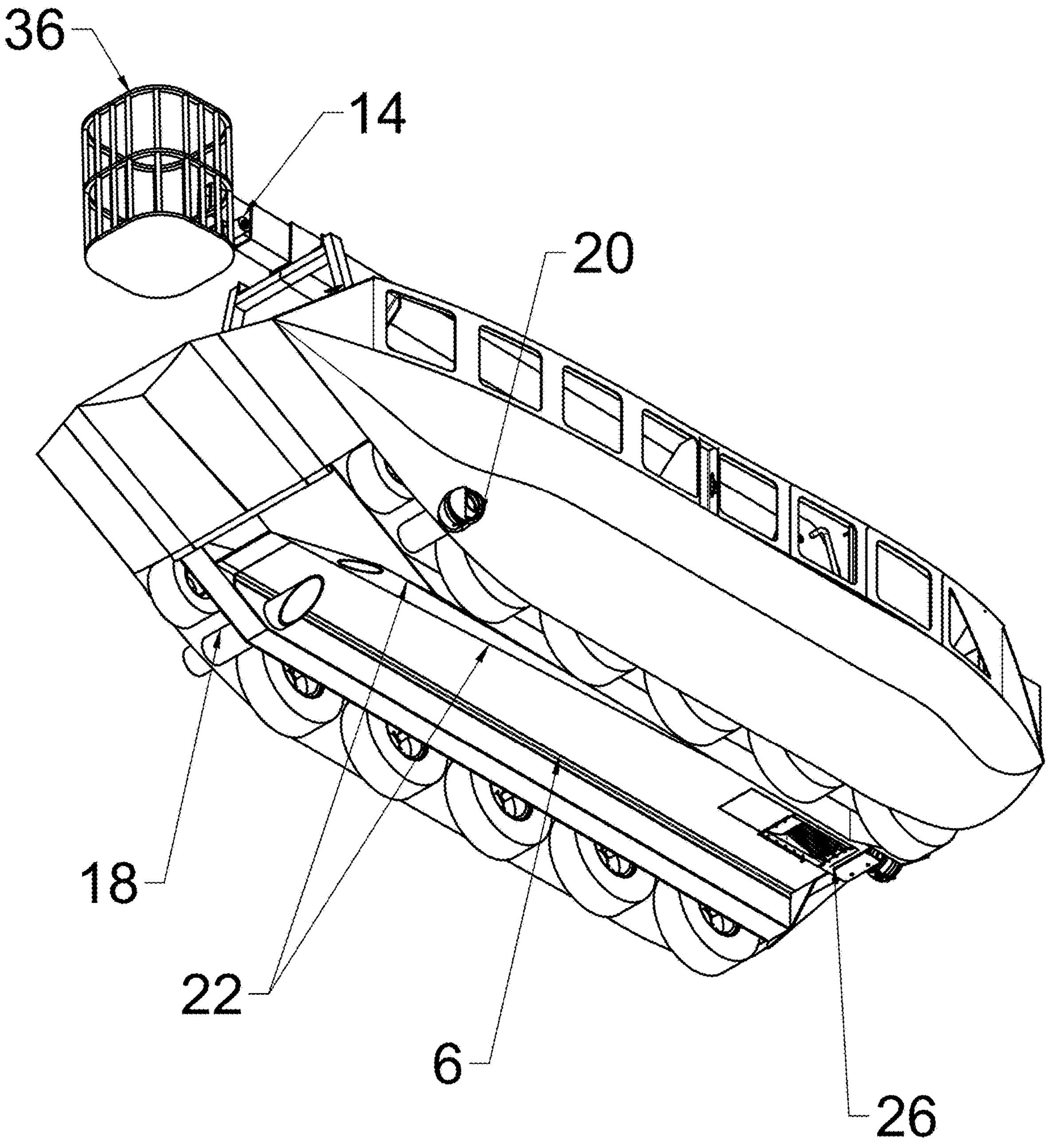
FIG. 14 illustrates a front left underside view of the vehicle with sponsons in the lowered position, side thruster inner tube sections, optional left side thruster nozzle and vectoring cups, side thruster tube on the right side, left inner ballast/flotation/tank fairings installed, right inner ballast/flotation/tank fairings uninstalled, center chassis bottom, and rear water jet intake.
Figure 15:
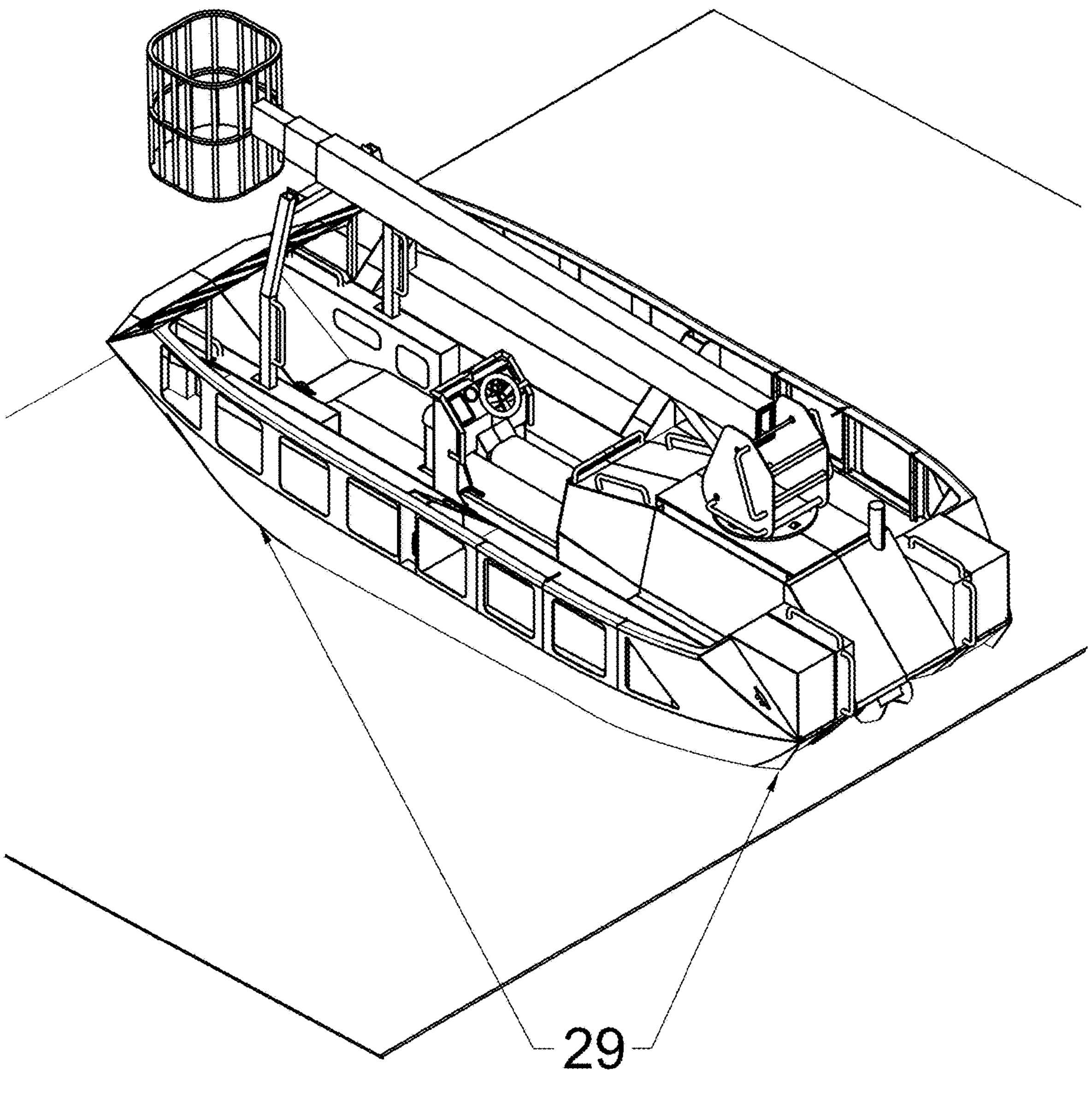
FIG. 15 illustrates a top left rear view of the vehicle in water depicting the approximate location of the waterline plane when floating in water deeper than the bottom of the lowest wheels or installed OTTs.
Figure 16:
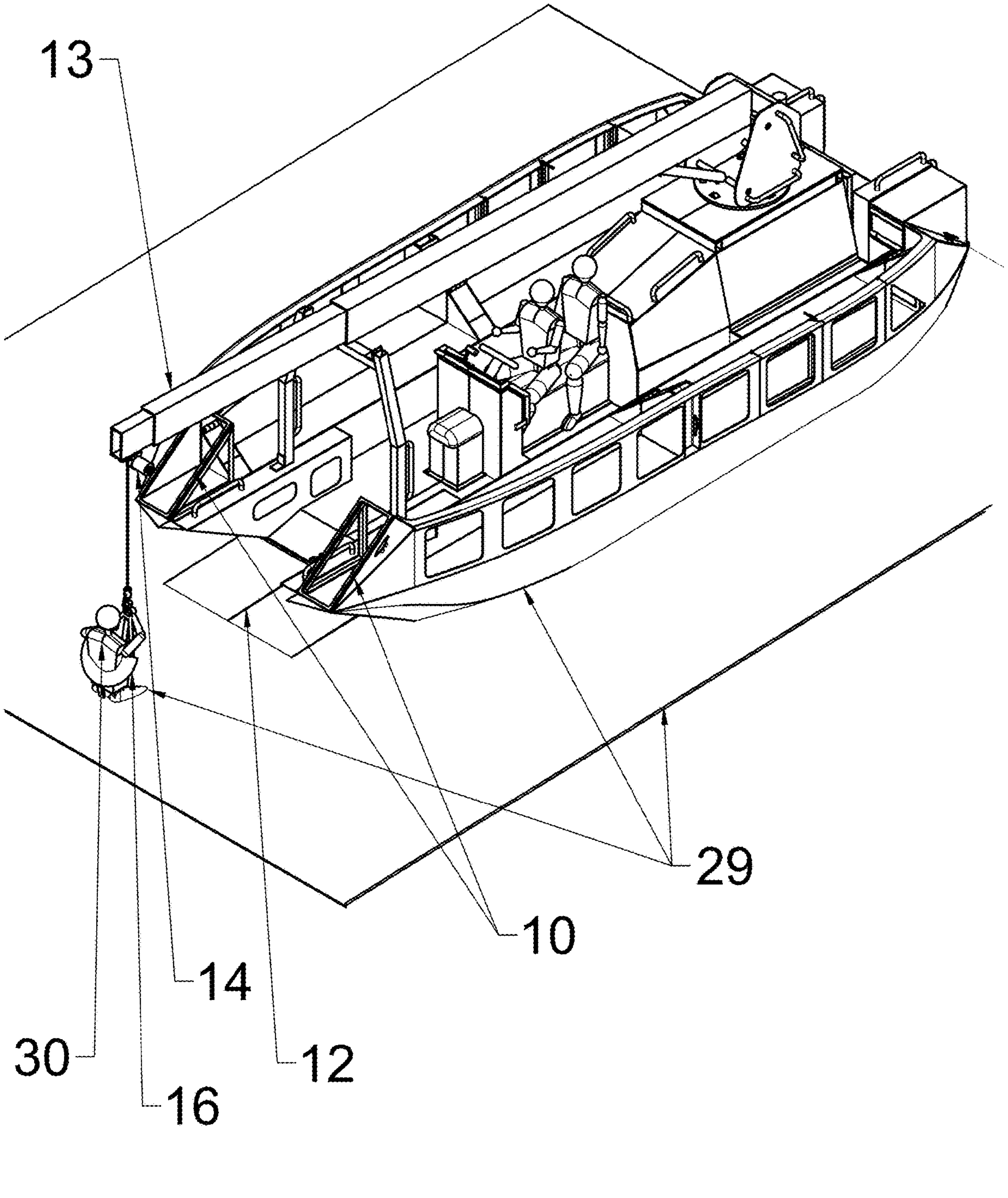
FIG. 16 illustrates a configuration for extracting a person from the water by use of the ladder/crane/hoist in the extended position, the front ramp lowered to the horizontal position, and inner tri-fold windows in the open position. The person in the water is brought into the vehicle by coordinated hoisting upward with the winch cable and retracting the telescoping ladder section, thus positioning the person directly over the open front ramp area of the vehicle.
Figure 17:
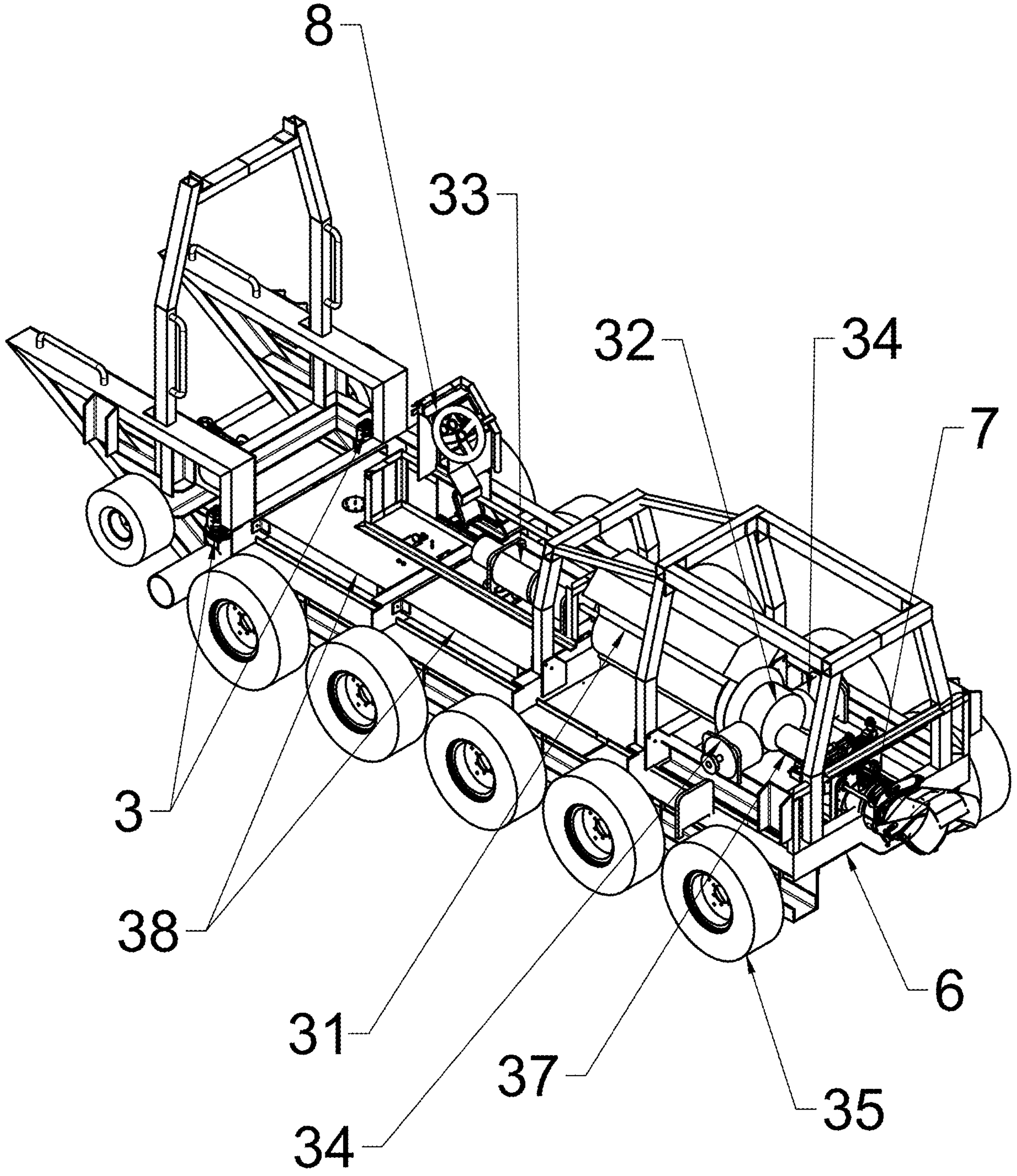
FIG. 17 illustrates a configuration of integrated propulsion systems including a diesel engine prime mover, marine transmission, marine waterjet, three front-mounted hydraulic pumps, drive wheel hydraulic or electric motors, hydraulic or electric side thrusters, six drive wheels and the driver console. Electrical or hydraulic connections between pumps, generators, or motors are not in view.

The vehicle comprises a structural center chassis 6 typically made of metal or composite material, on which a plurality of drive wheels 35 are mounted longitudinally along the left and right sides of center chassis 6. Optional Over Tire Tracks (OTTs) 4 can be fitted to the drive wheels 35 to reduce ground pressure on unstable ground surfaces 1. The drive wheels near the front and rear of the vehicle are fixed slightly above the ground surface 1 to create a slightly arcing surface tangent to the bottom tread surface of each wheel. An engine 31 prime mover is mounted on the interior of the center chassis 6 which powers the drive wheels 35 by turning hydraulic pumps or electric generators 33 which provide hydraulic or electric power to independently operated drive wheel hydraulic or electric motors 34 on each side of the vehicle which are connected to the drive wheels on the respective side via a pulley and belt, or chain and sprocket system. Water propulsion is achieved through the diesel engine or electric prime mover 31 connected to a marine water jet 7 through a marine transmission 32 and driveshaft 37. Transverse mounted side thrusters 3 are powered by electric or hydraulic power produced by hydraulic drive pumps or generators 33 mounted to the diesel engine 31. Energy to power the prime mover is stored in liquid fuel tanks or battery cells 38.

Flotation is achieved by enclosing the center chassis with a hinged bulkhead 12 on the front of the vehicle that rotates upward to create a bow and rotates downward to act as a ramp to allow entry into the vehicle from the water or the ground 1. Flotation is augmented by two sponsons 2 made of metal or composite mounted to the outboard sections of the vehicle adjacent the drive wheels. To reduce vehicle width for highway transport and for maintenance access to the wheels 35, the sponsons 2 can rotate upward and inward approximately 180 degrees as depicted. The sponsons 2 can be filled with liquid to provide balancing ballast or tank capacity. Flotation is further augmented by metal or composite fairings 22 mounted to the bottom sections of the center chassis 6 which provide flotation when empty and tank or ballast capability when filled with liquid. The fairings 22 are internally sectioned longitudinally with transverse bulkheads to allow longitudinal, vertical, and transverse manipulation of the vehicle center of gravity and manipulate the vertical position of the waterline 29. The fairings 22 are shaped and arranged proximate to the marine water jet intake 26 to force water into the intake at higher vehicle speeds.

The vehicle is controlled by a driver 21 sitting on a driver seat 9 proximate a driver console 8 on which a steering wheel 23, throttle lever 24, and pedals 25 are mounted. The steering wheel 23 is connected mechanically, electrically, or hydraulically to the drive wheel motors and/or generators, the side thrusters, and the rear marine water jet steering nozzle 27. The throttle lever is connected mechanically, electrically, or hydraulically to the engine 31, the drive wheel motors 34, the marine transmission 32, and the water jet reversing bucket 28. The pedals are connected electrically, mechanically, or hydraulically to the drive pumps or electric generators 33, the hydraulic or electric powered side thrusters 3, side thruster vectoring cups 20, side thruster nozzle 19 attached on the outer sides of the side thruster intermediate tube 18, and vehicle brakes.

Driver 21, crew, and passengers, exit and enter the vehicle via the hinged front ramp 12 that can be lowered to the ground or placed in the horizontal position as a platform. Tri-fold windows 10, 11 are fitted to each side of the front entry area. The windows 10, 11 provide visibility for the driver 21 and deflect wind and water from the interior of the vehicle. The two inner tri-fold windows 10 are hinged in the middle and fold outboard on top of the outer tri fold window 11 when entry or exit via the front ramp 7 12 is required. The outer tri-fold window 11 folds inboard and on top of the inner tri-fold windows 10 to allow space for the sponsons 2 to rotate upward and inward. Two rear entry step assemblies 17 that rotate downward to allow access from the rear of the vehicle while in water or on the ground. The rear entry step assemblies 17 also rotate down to allow space for the sponsons 2 to rotate up and inward.

An articulating and telescoping ladder/crane/hoist assembly 5 is fixed to the top of the vehicle. The ladder/crane/hoist assembly 5 rotates on a vertical axis to operate on the sides of the vehicle and raises and lowers on a horizontal axis to increase heigh of the ladder and provide lifting ability as a crane. A telescoping ladder/crane/hoist section 13 extends out of the end of the main ladder structure to increase the ladder/crane/hoist 5 overall length and reach. A hoist winch 14 is fixed to the end of the telescoping ladder/crane/hoist section 13 to allow vertical lifting of people and cargo. The hoist winch 14 lifts cargo into the front of the vehicle via the hinged front ramp 12, loads non-ambulatory people via a hoistable litter 15, or retrieves a person in the water (PIW) 30 via with rescue strop 16. A utility/rescue bucket 36 can be attached to the end of the crane for rescuing people from rooftops or providing an elevated work platform for utility repair.

Manufacture and assembly of the vehicle is as follows:

First, assemble the center chassis section 6. Install drivetrain components including engine prime mover 31, marine transmission 32, marine water jet 7, hydraulic drive pumps or electric generators 33, drive wheel hydraulic or electric motors 34, drive wheels 35, and hydraulic or electric side thrusters 3. Next, install two sponsons 2, rear entry steps 17, hinged front ramp 12, on their respective pin connections. Next, install inner ballast/tank/flotation fairings 22 on the bottom of the center chassis section 6. Install the driver seat 9 and driver console 8. Install side thruster vectoring cups 20 and/or side thruster nozzle 19 onto the outer section of the sponsons 2 as necessary. Install ladder/crane/hoist assembly 5 to the top of the vehicle above engine. Install all vehicle controls into the driver console 8 including steering wheel 23, throttle lever 24, and pedals 25 and make all electric, hydraulic, or mechanical connections between controls and drivetrain components.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A vehicle, configured to access and/or transport people, equipment, or cargo on land and over water; the vehicle comprising:

a chassis joined to a forward bulkhead, a rear bulkhead, a first side bulkhead, and a second side bulkhead; each bulkhead is joined to a plurality of body fairing sections that provide a function;

at least two wheels arranged proximate the first side and the second side of the vehicle;

a propulsion system, joined to the chassis and further comprising a prime mover powering independent electric or hydraulic motors driving the wheels on the first side and the second sides;

at least one rear mounted water jet arranged between the at least two wheels at a height substantially above the lowest point of the wheels, and two electric or hydraulically powered, transversely arranged, side thrusters mounted on the first side and the second side proximate the front of the vehicle;

a control system comprising:

a direction controller, arranged at a driver station arranged within chassis, wherein the direction controller controls the direction of vehicle travel through inputs that variably and independently control speed and direction of the at least two wheels, and/or control a left and right nozzle deflection of the at least one rear mounted water jet, and/or actuation of side thruster vectoring cups;

a throttle lever, arranged proximate to the steering wheel or joystick that controls the vehicle speed and direction in forward or reverse wherein a prime mover, hydraulic motor, or electric motor rotational speed is increased with increased throttle lever movement from neutral, and water jet reversing bucket actuation is dictated by the position of the throttle lever;

a pair of pedals arranged proximate the driver's feet wherein the side thrusters are controlled to provide immediate and precise yaw control by means of fore and aft positioning of the inversely moving pedals that control direction and magnitude of turning thrust near the front of the vehicle, and the pedals also control vectoring cups on the side thrusters to provide forward and aft thrust in some modes of operation; and wherein the vehicle is precisely propelled and controlled by simultaneous and/or independent actuation of the wheels, rear water jet, and transverse side thrusters.

2. The vehicle of claim 1, wherein the function is at least one member of a function set consisting of: flotation, fairing, liquid storage, and ballast.

3. The vehicle of claim 1, wherein the prime mover is at least one member of a prime mover set consisting of: an engine prime mover, a marine water jet, a hydraulic drive pump, an electric generator, a drive wheel hydraulic motor, and an electric motor.

4. The vehicle of claim 1, wherein the direction controller is one member of a direction controller set consisting of a steering wheel and a joystick.

5. The vehicle of claim 1, further comprising a plurality of fairing sections mounted to the chassis exterior between the wheels wherein the shape of the fairings reduce drag of eddy currents near the inboard surfaces of the wheels, direct converging wakes from the outer lower portions of the vehicle upward to supply the water jet(s) intake(s) with minimally interrupted water flow for propulsion.

6. The vehicle of claim 1, further comprising an overhead articulating and telescoping ladder that functions as a ladder, crane, overhead hoist, and debris deflector wherein operators can access roofs and upper stories of buildings, cargo or people can be moved around the perimeter of the vehicle and loaded into the front of the vehicle via coordinated actuation of the hoist with the telescoping crane, and low hanging obstacles such as tree limbs or power lines on the desired path of travel can be manipulated to the side or lifted to allow passage beneath.

7. The vehicle of claim 1, further comprising a pair of externally mounted, vertically pivoting sponsons proximate to the outer edge of the drive wheels to reduce eddy current drag around the wheel assemblies, to increase waterplane area with draft, to widen the vehicle beyond the maximum width allowed to be towed on highways with provisions to reduce overall width to within highway width limits, provide flotation or ballast near the perimeter of the vehicle to balance against loads being hoisted or moved beyond the opposite perimeter of the vehicle.

8. The vehicle of claim 1, further comprising at least two drive wheels arranged in line on the first side and the second side of the vehicle, wherein the vertical positions of the wheels are varied along longitudinally along the side of the vehicle to provide a slight arc where the wheels contact the ground, allowing the vehicle to rock slightly when traversing uneven terrain;

a plurality of internally partitioned fairings that function as flotation, liquid storage tanks, or ballast enable manipulation of the vehicle's center of gravity to affect the rocking motion of the vehicle when traversing uneven terrain wherein a forward center of gravity stiffens the rocking motion when rolling over bumps and an aft center of gravity permits higher rocking amplitude resulting in a softer ride but with more overall vertical motion.

9. A vehicle, configured to access and/or transport people, equipment, or cargo on land and over water; the vehicle comprising:

a chassis joined to a forward bulkhead, a rear bulkhead, a first side bulkhead, and a second side bulkhead; each bulkhead is joined to a plurality of body fairing sections that provide a function;

at least two wheels arranged proximate the first side and the second side of the vehicle;

a propulsion system, joined to the chassis and further comprising a prime mover powering independent electric or hydraulic motors driving the wheels on the first side and the second sides;

at least one rear mounted water jet arranged between the at least two wheels at a height substantially above the lowest point of the wheels, and two electric or hydraulically powered, transversely arranged, side thrusters mounted on the first side and the second side proximate the front of the vehicle;

a pair of externally mounted, vertically pivoting sponsons proximate to the outer edge of the drive wheels to reduce eddy current drag around the wheel assemblies, to increase waterplane area with draft, to widen the vehicle beyond the maximum width allowed to be towed on highways with provisions to reduce overall width to within highway width limits, provide flotation or ballast near the perimeter of the vehicle to balance against loads being hoisted or moved beyond the opposite perimeter of the vehicle; and wherein the vehicle is precisely propelled and controlled by simultaneous and/or independent actuation of the wheels, rear water jet, and transverse side thrusters.

10. The vehicle of claim 9, further comprising a control system comprising:

a direction controller arranged at a driver station and controlling the direction of vehicle travel through inputs that control a plurality of the wheels or a discharge of the at least one rear mounted water jet;

a throttle lever arranged proximate to the direction controller and controlling the vehicle speed and a water jet reversing bucket actuation; and a pair of pedals arranged at the driver station and controlling the side thrusters.

11. The vehicle of claim 10, wherein the direction controller is one member of a direction controller set consisting of a steering wheel and a joystick.

12. The vehicle of claim 9, further comprising at least two drive wheels arranged in line on the first side and the second side of the vehicle, wherein the vertical positions of the first side wheels are varied, and the vertical positions of the second side wheels are varied.

13. The vehicle of claim 9, further comprising a plurality of fairing sections mounted to the chassis exterior between the first side wheels and the second side wheels, wherein the shape of the fairing sections reduce drag and direct converging wakes to supply an intake of at least one rear mounted water jet.

14. The vehicle of claim 9, further comprising a plurality of internally partitioned fairings enabling the adjustability of the vehicle's center of gravity.

15. A vehicle, configured to access and/or transport people, equipment, or cargo on land and over water; the vehicle comprising:

a chassis joined to a forward bulkhead, a rear bulkhead, a first side bulkhead, and a second side bulkhead; each bulkhead is joined to a plurality of body fairing sections that provide a function;

at least two drive wheels arranged in line on the first side and the second side of the vehicle, wherein the vertical positions of the wheels are varied along longitudinally along the side of the vehicle to provide a slight arc where the wheels contact the ground, allowing the vehicle to rock slightly when traversing uneven terrain;

a propulsion system, joined to the chassis and further comprising a prime mover powering independent electric or hydraulic motors driving the wheels on the first side and the second sides;

at least one rear mounted water jet arranged between the at least two wheels at a height substantially above the lowest point of the wheels, and two electric or hydraulically powered, transversely arranged, side thrusters mounted on the first side and the second side proximate the front of the vehicle;

a plurality of internally partitioned fairings that function as flotation, liquid storage tanks, or ballast enable manipulation of the vehicle's center of gravity to affect the rocking motion of the vehicle when traversing uneven terrain wherein a forward center of gravity stiffens the rocking motion when rolling over bumps and an aft center of gravity permits higher rocking amplitude resulting in a softer ride but with more overall vertical motion; and wherein the vehicle is precisely propelled and controlled by simultaneous and/or independent actuation of the wheels, rear water jet, and transverse side thrusters.

16. The vehicle of claim 15, further comprising a control system comprising:

a direction controller arranged at a driver station and controlling the direction of vehicle travel through inputs that control a plurality of the wheels or a discharge of the at least one rear mounted water jet;

a throttle lever arranged proximate to the direction controller and controlling the vehicle speed and a water jet reversing bucket actuation; and a pair of pedals arranged at the driver station and controlling the side thrusters.

17. The vehicle of claim 16, further comprising a plurality of fairing sections mounted to the chassis exterior between the first side wheels and the second side wheels, wherein the shape of the fairing sections reduce drag and direct converging wakes to supply an intake of at least one rear mounted water jet.

18. The vehicle of claim 17, further comprising a pair of externally mounted and vertically pivoting sponsons.

19. The vehicle of claim 18, further comprising a plurality of internally partitioned fairings enabling the adjustability of the vehicle's center of gravity.

20. The vehicle of claim 19, further comprising a first side over tire track mounted to a plurality of first side wheels, a second side over tire track mounted to a plurality of second side wheels, and an overhead articulating and telescoping ladder having a lifting hoist.

* * * * *